(12) United States Patent
Allard et al.

(10) Patent No.: US 8,528,346 B2
(45) Date of Patent: Sep. 10, 2013

(54) VACUUM COMPARTMENT IN REFRIGERATOR

(75) Inventors: Paul B. Allard, Stevensville, MI (US); Douglas D. Leclear, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 13/366,673

(22) Filed: Feb. 6, 2012

(65) Prior Publication Data

US 2012/0132292 A1 May 31, 2012

Related U.S. Application Data (63) Continuation of application No. 12/402,554, filed on Mar. 12, 2009, now Pat. No. 8,127,561.

(60) Provisional application No. 61/035,775, filed on Mar. 12, 2008.

(51) Int. Cl.
*F25D 25/00* (2006.01)
(52) U.S. Cl.
USPC ............................ 62/62; 62/100; 62/169
(58) Field of Classification Search
USPC ................ 62/62, 78, 100, 169, 176.1, 268, 62/270, 441
See application file for complete search history.

(56) References Cited

U.S. PATENT DOCUMENTS

| | | | | |
|---|---|---|---|---|
| 2,894,845 A * | 7/1959 | Stoddard | | 426/419 |
| 4,157,018 A * | 6/1979 | Goltsos | | 62/373 |
| 4,870,836 A * | 10/1989 | Pink | | 62/382 |
| 5,342,036 A * | 8/1994 | Golicz | | 271/3.17 |
| 5,572,998 A * | 11/1996 | O'Neill et al. | | 600/425 |
| 6,054,077 A * | 4/2000 | Comb et al. | | 264/40.7 |
| 6,534,017 B1 * | 3/2003 | Bottwein et al. | | 422/561 |
| 6,745,588 B2 * | 6/2004 | Kahler | | 62/246 |
| 7,044,569 B1 * | 5/2006 | Relyea et al. | | 312/249.11 |
| 7,325,409 B2 * | 2/2008 | Espinosa | | 62/78 |
| 7,355,131 B2 * | 4/2008 | Pathmanathan et al. | | 177/144 |
| 7,809,470 B2 * | 10/2010 | Shoenfeld | | 700/243 |
| 2006/0117763 A1 * | 6/2006 | Espinosa et al. | | 62/78 |

* cited by examiner

*Primary Examiner* — Mohammad M Ali
(74) *Attorney, Agent, or Firm* — Kirk W. Goodwin; Price Heneveld LLP

(57) ABSTRACT

A refrigerator comprises a vacuum source and a food storage compartment including a drawer unit having a storage space. The food storage compartment is operable between a substantially air-tight retracted position and an open extended position. A vacuum source is in communication with the storage space of the drawer unit and is operable to reduce air pressure inside the drawer unit during an evacuation event. A sealing unit includes a base connected to the drawer unit. A sealing bracket is hingedly-connected to the base and operable between a raised position and a lowered position, the sealing bracket adapted to abut the base when in the lowered position. A heat sealing bar is disposed on one of the base and the sealing bracket. A control system is operable to activate the vacuum source and initiate the evacuation event when the drawer unit is in the air-tight retracted position.

15 Claims, 13 Drawing Sheets

VACUUM COMPARTMENT IN REFRIGERATOR

CROSS-REFERENCE TO RELATED APPLICATIONS

This application is a continuation of and claims priority to U.S. patent application Ser. No. 12/402,554, entitled "VACUUM COMPARTMENT IN REFRIGERATOR," filed on Mar. 12, 2009, which claims priority under 35 U.S.C. §119(e) to U.S. Provisional Patent Application No. 61/035,775, entitled "REFRIGERATOR WITH SPACE MANAGEMENT MODULES," filed on Mar. 12, 2008, the entire disclosures of which are hereby incorporated herein by reference.

BACKGROUND OF THE PRESENT INVENTION

The present invention generally relates to a vacuum sealing device and, more specifically, to a vacuum sealing device incorporated into a refrigerator compartment.

SUMMARY OF THE INVENTION

In one aspect of the present invention, a refrigerator has a food storage compartment including a drawer unit having a storage space. The food storage compartment is operable between a substantially air-tight retracted position and an open extended position. The vacuum source is in communication with the storage space of the drawer unit and is operable to reduce air pressure inside the drawer unit during an evacuation event when the drawer unit is in the retracted position. A sealing unit includes a base connected to the drawer unit. A sealing bracket is hingedly-connected to the base and operable between a raised position and a lowered position, the sealing bracket adapted to abut the base when in the lowered position. A heat sealing bar is disposed on one of the base and the sealing bracket. A control system is operable to activate the vacuum source and initiate the evacuation event when the drawer unit has been placed in the air-tight retracted position.

In another aspect of the present invention, a compartment for a refrigerator includes a drawer unit having a storage space and operable between a closed retracted position and an open extended position. A vacuum source is in communication with the storage space of the drawer unit and is operable to reduce air pressure inside the drawer unit below atmospheric pressure during an evacuation event when the drawer unit is in the retracted position. A sealing unit includes a base connected to the drawer unit. A sealing bracket is hingedly-connected to the base and operable between a raised position and a lowered position, the sealing bracket adapted to abut the base when in the closed position. A heat sealing bar is disposed on one of the base and the sealing bracket. A control system is operable to activate the vacuum source and initiate the evacuation event when both the sealing bracket has been placed in the lowered position and the drawer unit is in the air-tight retracted position, and further is operable to activate the heat sealing device when a predetermined low pressure level has been met during the evacuation event.

In another aspect of the present invention, a method of sealing a storage container in a refrigerator includes providing a drawer unit in the refrigerator having a storage space and operable between a closed retracted position and an open extended position. A sealable bag is inserted into the compartment. A top portion of the bag is placed adjacent to a heat sealing device. The top portion of the bag is clamped in the heat sealing device. The drawer unit is placed into the closed retracted position. A vacuum source is actuated in communication with the storage space of the compartment to reduce air pressure within the sealable bag. The top portion of the sealable bag is sealed in the heat sealing device.

These and other features, advantages and objects of the present invention will be further understood and appreciated by those skilled in the art upon studying the following specification, claims, and appended drawings.

DETAILED DESCRIPTION OF EMBODIMENTS

Figure 1:
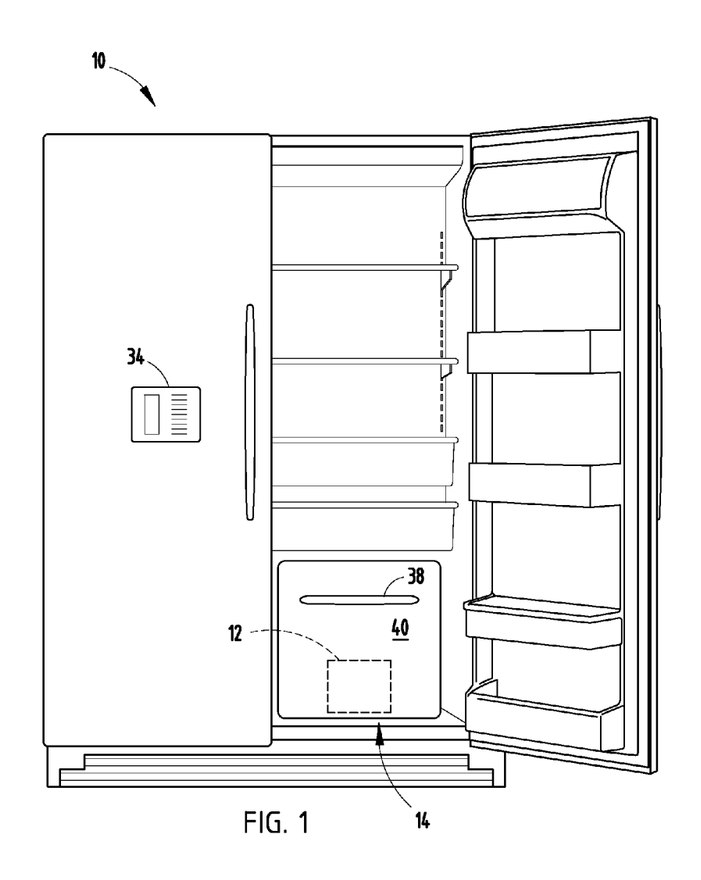
FIG. 1 is a front elevational view of a refrigerator incorporating one embodiment of the present invention.
Figure 2:
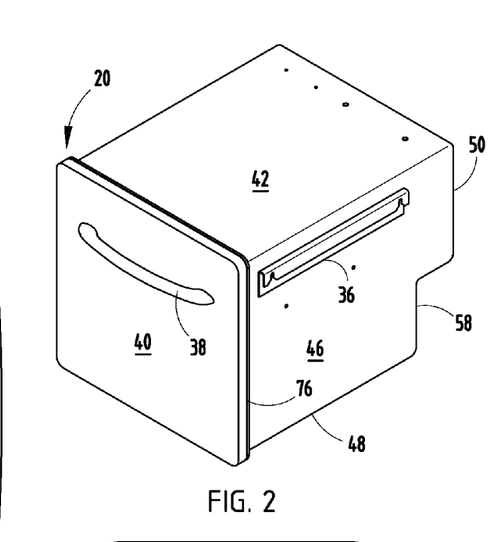
FIG. 2 is a top perspective view of one embodiment of a food storage compartment.
Figure 3:
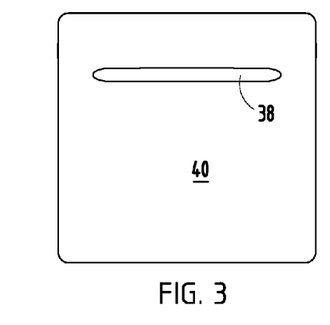
FIG. 3 is a front elevational view of the food storage compartment of FIG. 2.

For purposes of description herein the terms "upper," "lower," "right," "left," "rear," "front," "vertical," "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
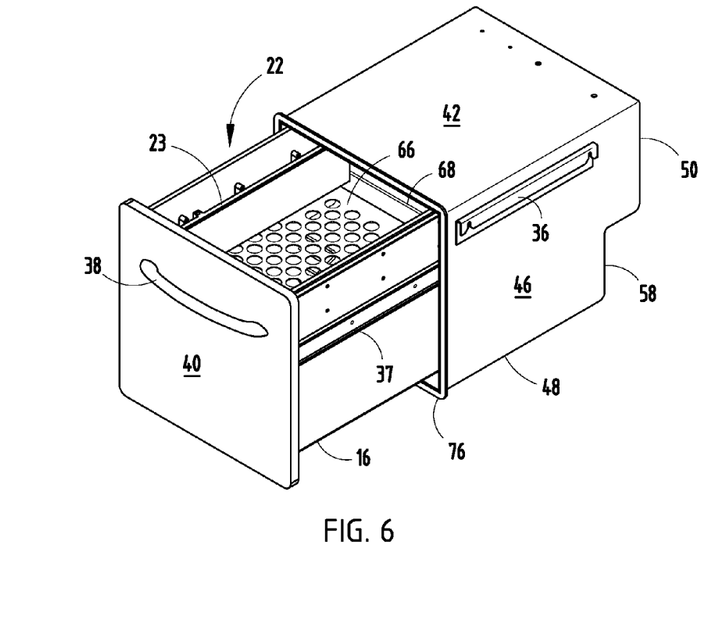
FIG. 6 is a top perspective view of the food storage compartment with the drawer unit in the open position.

The reference numeral 10 shown in FIGS. 1 and 6-8 generally designate a refrigerator having a vacuum source 12 and a food storage compartment 14 including a drawer unit 16 having a storage space 18. The food storage compartment 14 is operable between an air-tight retracted position 20 and an open extended position 22 (FIG. 6). The vacuum source 12 is in communication with the storage space 18 of the drawer unit 16 and is operable to reduce air pressure inside the drawer unit 16 below atmospheric pressure during an evacuation event when the drawer unit 16 is in the retracted position 20. A sealing unit 23 includes a base 24 connected to the drawer unit 16. A sealing bracket 26 is hingedly-connected to the base 24 and operable between a raised position 28 and a lowered position 30. The sealing bracket 26 is adapted to abut the base 24 when in the lowered position 30. A heat sealing bar 32 is disposed on one of the base 24 and the sealing bracket 26. A control system 34 is operable to activate the vacuum source 12 and initiate an evacuation event when the drawer unit 16 is in the air-tight retracted position 20.

Figure 4:
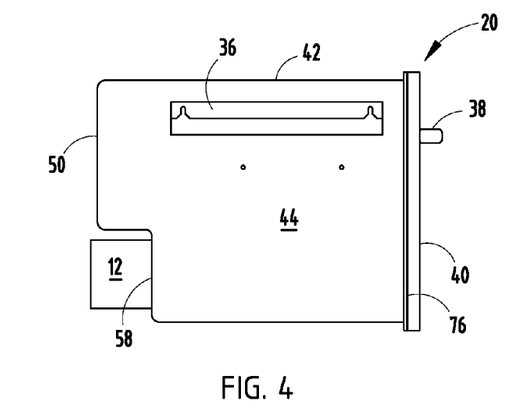
FIG. 4 is a left side elevational view of the food storage compartment of FIG. 2.
Figure 5:
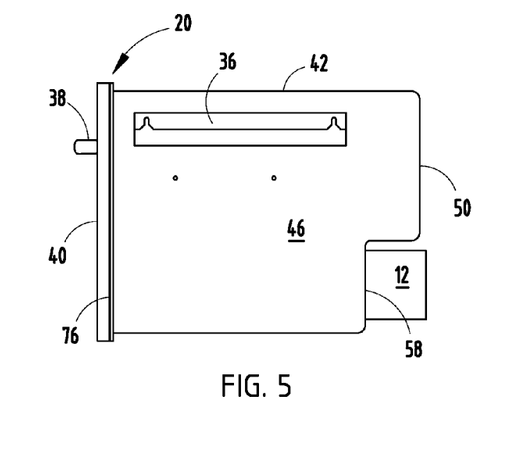
FIG. 5 is a right side elevational view of the food storage compartment of FIG. 2.

Referring again to FIG. 1, the food storage compartment 14 is generally positioned at a bottom portion of the refrigerator 10, however it is contemplated that the food storage compartment 14 could be positioned anywhere inside the refrigerator 10. The food storage compartment 14 includes side supports 36 (FIGS. 4 and 5) that secure and align the food storage compartment 14 in position in the refrigerator 10. Rails 37 (FIG. 6) allow horizontal linear translation of the drawer unit 16 relative to the food storage compartment 14 in the refrigerator 10. Accordingly, a user can pull on a handle 38 disposed on a front wall 40 of the drawer unit 16 and withdraw the drawer unit 16 from the food storage compartment 14 a predetermined distance. The predetermined distance is generally contemplated to be approximately the length of the drawer unit 16 such that large containers or food bags can be easily placed in the storage space 18.

Referring now to FIGS. 2-5, the food storage compartment 14 includes a top wall 42, first and second side walls 44, 46, a bottom wall 48 and a rear wall 50. The first and second side walls 44, 46 include the supports 36 (FIG. 6) discussed above which position the food storage compartment 14 inside the refrigerator 10. The rear wall 50 of the food storage compartment 14 includes an indented portion 58 which allows for adequate connection of a vacuum pump 60 (contained within vacuum source 12) behind the food storage compartment 14. The handle 38 is disposed at an upper portion of the front wall 40 of the drawer unit 16. The front wall 40 may be completely or partially translucent such that a user can view the contents of the drawer unit 16 when the drawer unit 16 is in the closed position. An interior portion of the first and second side walls 44, 46 supports the rails 37, which allow the horizontal linear translation of drawer unit 16.

Figure 7:
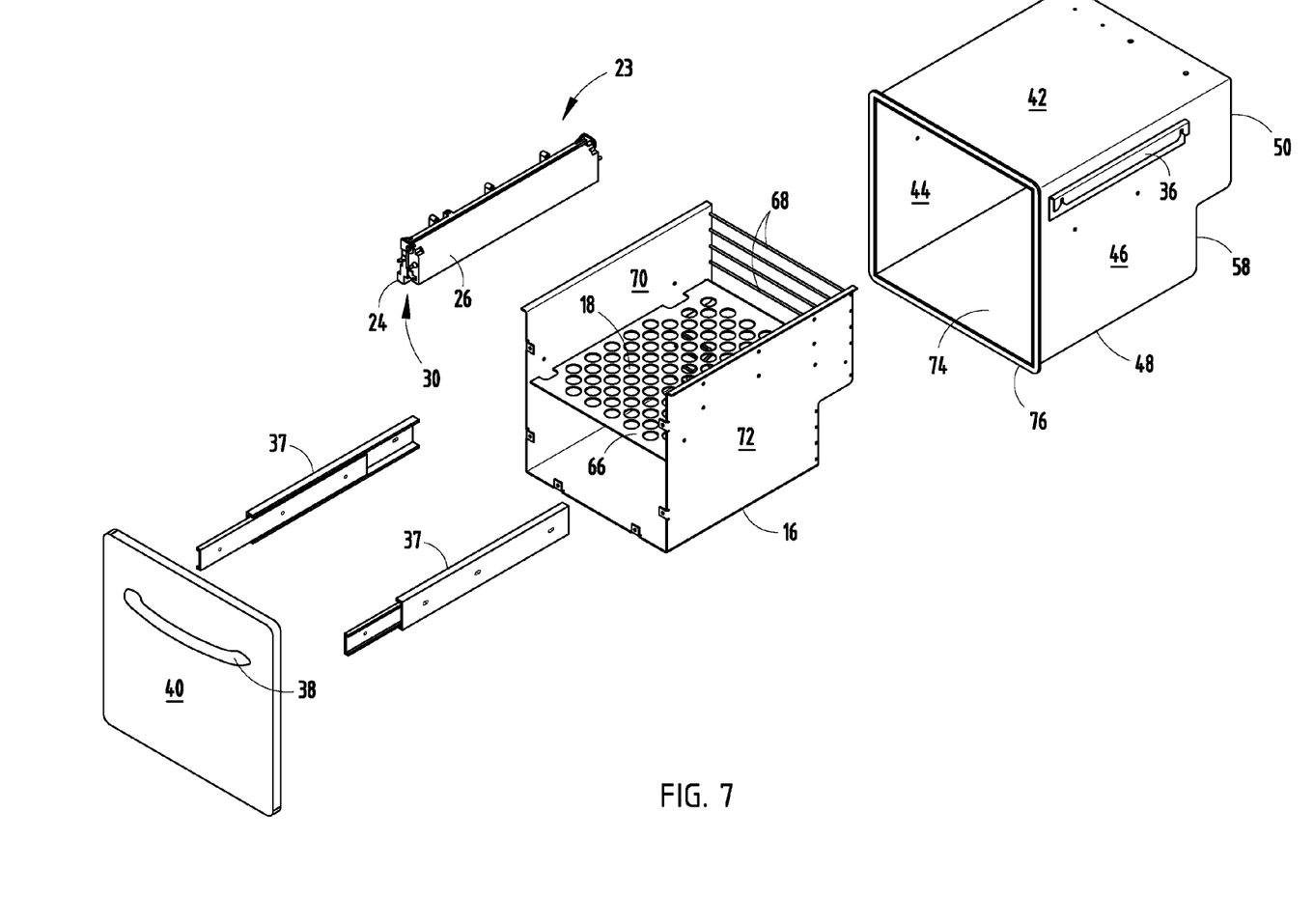
FIG. 7 is an exploded top perspective view of one embodiment of the food storage compartment of the present invention.
Figures 8, 9:
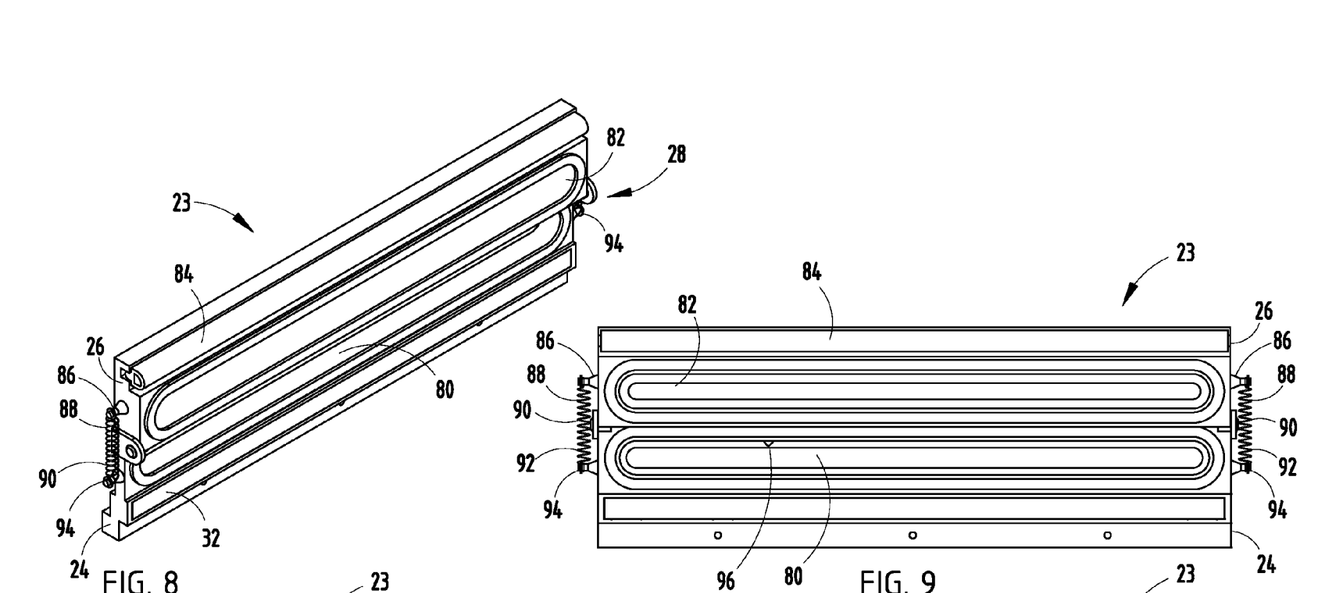
FIG. 8 is a top perspective view of one embodiment of the sealing unit of the present invention with the sealing bracket in the raised position.
FIG. 9 is a front elevational view of the sealing unit of FIG. 8.
Figure 10:
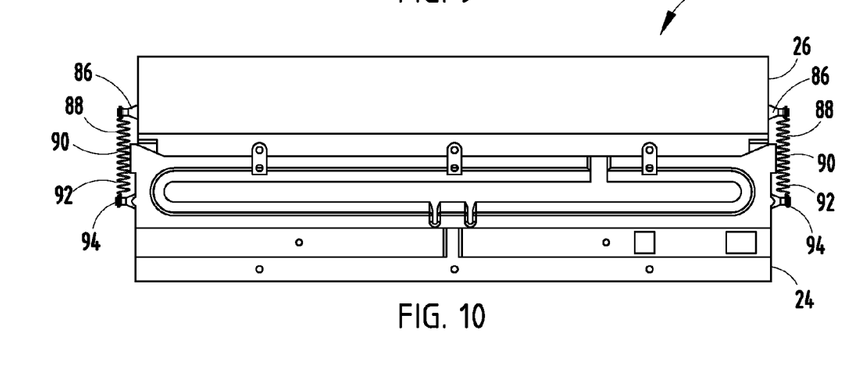
FIG. 10 is a rear elevational view of the sealing unit of FIG. 8.
Figure 11:
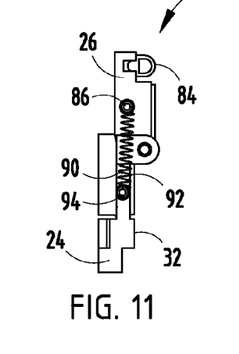
FIG. 11 is a side elevational view of the sealing unit of FIG. 8.
Figures 12, 13, 14, 15:
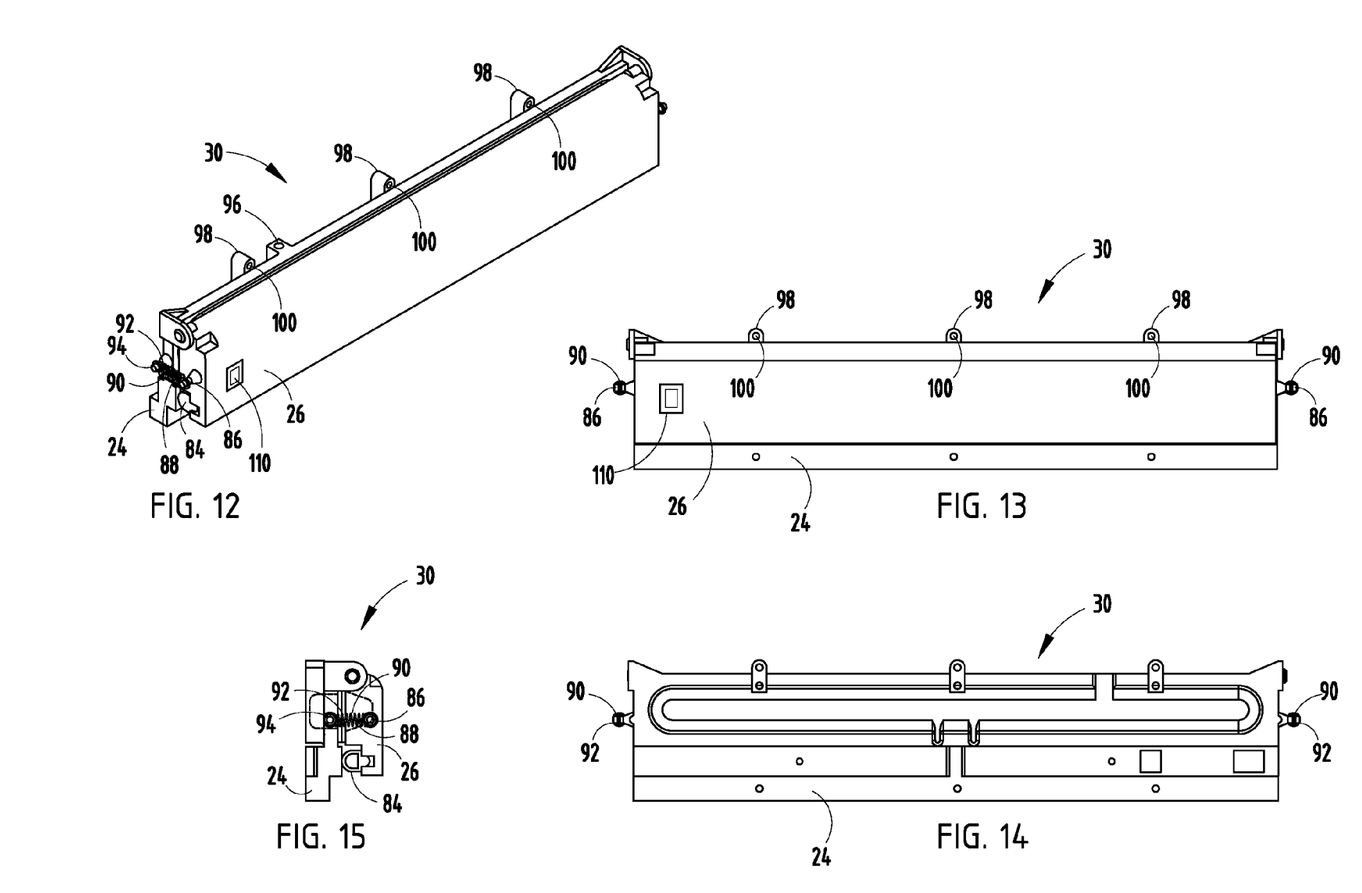
FIG. 12 is a top perspective view of one embodiment of a sealing unit of the present invention with the sealing bracket in the lowered position.
FIG. 13 is a front elevational view of the sealing unit of FIG. 12.
FIG. 14 is a rear elevational view of the sealing unit of FIG. 12.
FIG. 15 is a side elevational view of the sealing unit of FIG. 12.

Referring now to FIG. 7, the drawer unit 16 includes a perforated shelf 66 that is positionable in a multitude of vertical positions. A plurality of horizontally-extending rods 68 are disposed between and connect first and second sides 70, 72 of the drawer unit 16. Drawer unit 16 also includes a bottom portion 74. The food storage compartment 14 includes a peripheral lip 76, which assists a user in positioning the food storage compartment 14 in the refrigerator 10. The peripheral lip 76 is made of a sealing material that allows the front wall 40 to maintain an air-tight seal with the food storage compartment 14 when the drawer unit 16 is in the retracted position 20.

Referring to FIGS. 8-11, one embodiment of the sealing unit 23 includes a base 24 having a base vacuum cavity 80. The heat sealing bar 32 extends laterally along the linear extent of the base 24. The sealing bracket 26 is hingedly-connected to the base 24, which allows the sealing bracket 26 to be moved between the raised position 28 and the lowered position 30. The sealing bracket 26 includes a sealing bracket vacuum cavity 82 and is adapted to abut the base 24 when in the lowered position 30. The base vacuum cavity 80 or the sealing bracket vacuum cavity 82 or both may include a perimeter sealing gasket 83. A stop 84, made of heat resilient material, is positioned on the sealing bracket 26 and is aligned with the heat sealing bar 32 when the sealing bracket 26 is in the lowered position 30. It is contemplated that the heat sealing bar 32 could be positioned on the sealing bracket 26 and the stop 84 could be positioned on the base 24. The sealing bracket 26 includes sealing bracket extensions 86 that are rotatably connected with a first end 88 of an elastic member 90, such as a spring. A second end 92 of the elastic member 90 is connected with base extensions 94 such that the sealing bracket 26 is biased to the lowered position 30. The base 24 and sealing bracket 26 are aligned such that the sealing bracket 26 will maintain the raised position 28. The elastic members 90 bias the sealing bracket 26 to the raised position 28 until the sealing bracket 26 is rotated past a predetermined rotation point wherein the elastic members 90 bias the sealing bracket 26 to the lowered position 30.

Referring now to FIGS. 12-15, when a user begins to lower the sealing bracket 26, the sealing bracket 26 will accelerate under force of the elastic members 90 to the lowered position 30. The base vacuum cavity 80 includes a vacuum hole 96, which is in communication with a vacuum line that is connected with the vacuum source 12. Mounts 98 having apertures 100 therethrough are disposed on the base 24 and allow for secure engagement of the base 24 and therefore the sealing unit 23 to the drawer unit 16.

Figure 16A:
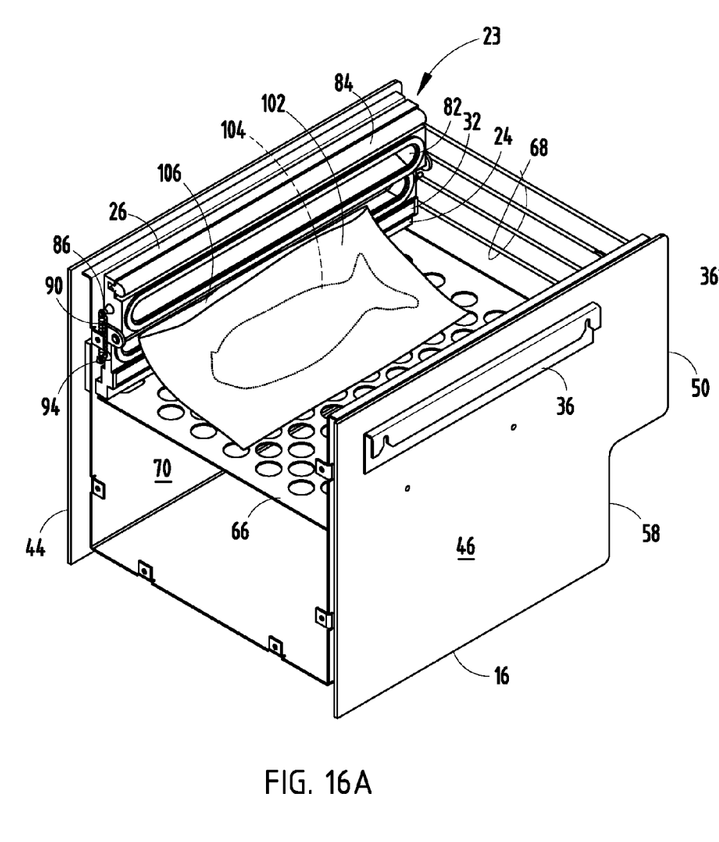
FIG. 16A is a top perspective view of the drawer unit prior to vacuuming and sealing a sealable bag.
Figure 16B:
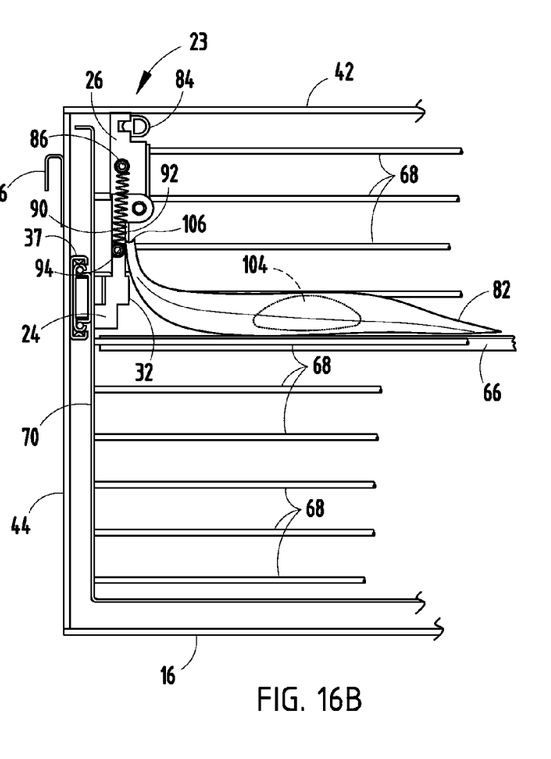
FIG. 16B is a partial front elevational view of the drawer unit of FIG. 16 prior to vacuuming and sealing a sealable bag.
Figure 17A:
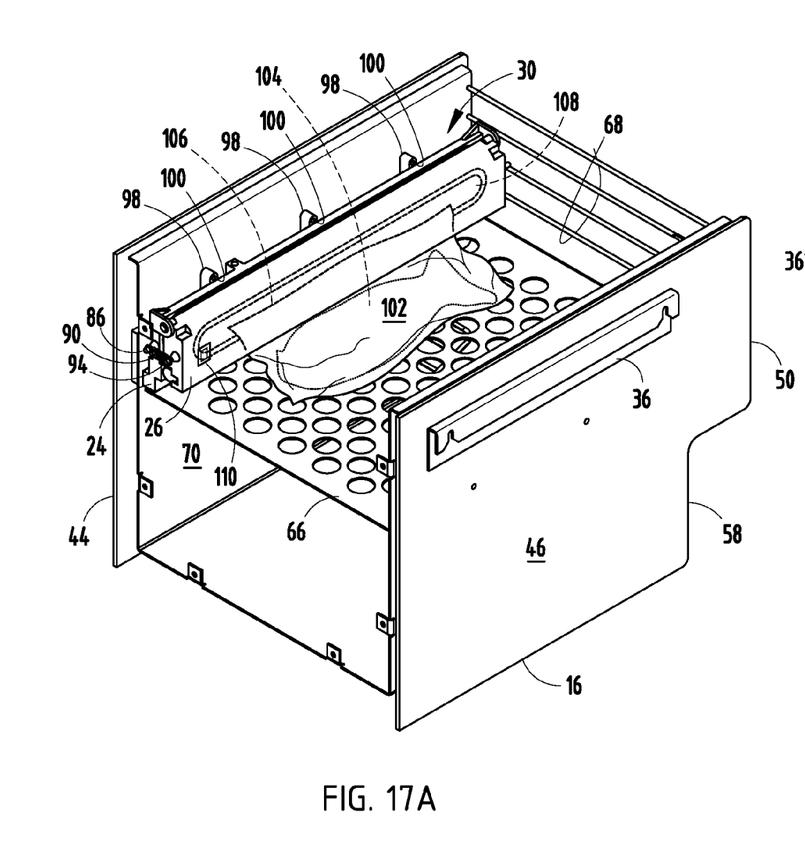
FIG. 17A is a top perspective view of the drawer unit after the sealable bag has been vacuumed and during the sealing process.
Figure 17B:
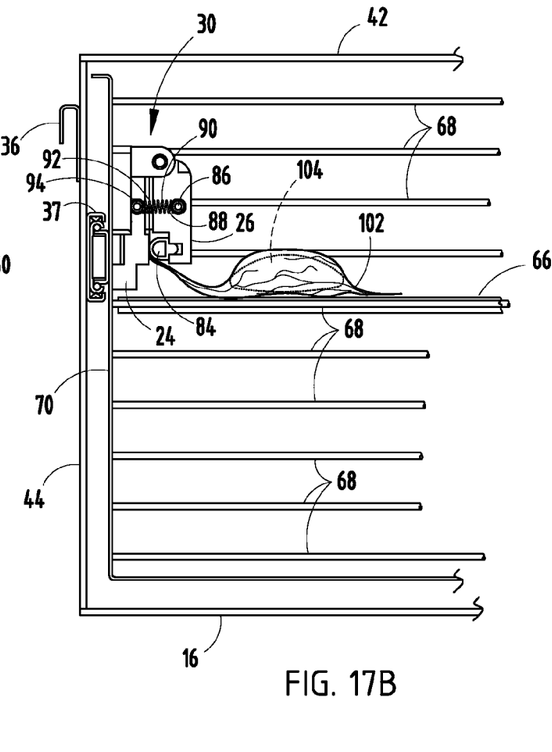
FIG. 17B is a partial front elevational view of the sealing bag of FIG. 17 after being vacuumed and during the sealing process.

Referring to FIGS. 16A and 16B, during use, a sealable bag 102 and the contents 104 of the sealable bag 102 are positioned on the perforated shelf 66 with the open end or mouth 106 of the sealable bag 102 adjacent the base 24 of the sealing unit 23. More specifically, the mouth 106 of the sealable bag 102 is positioned in the base vacuum cavity 80 such that when the sealing bracket 26 is placed in the lowered position 30, a sealed compartment 108 is formed between the sealing bracket vacuum cavity 82 and the base vacuum cavity 80 (FIGS. 17A and 17B). The control system 34 disposed on the front of the refrigerator 10 or on the drawer unit 16 is then activated such that the vacuum source 12 initiates an evacuation event drawing air from the retracted and sealed food storage compartment 14 and consequently the sealable bag 102. When the sealable bag 102 has reached a predetermined air pressure, the sealing unit 23 activates the heat sealing bar 32, which causes the mouth 106 of the sealable bag 102 to seal shut. A pressure gauge 110 is disposed in the drawer unit 16 and when the pressure in the drawer unit 16 has reached a predetermined pressure activates the sealing unit 23 or enables the sealing unit 23 to become activated by the user after an evacuation event has occurred.

Figure 18:
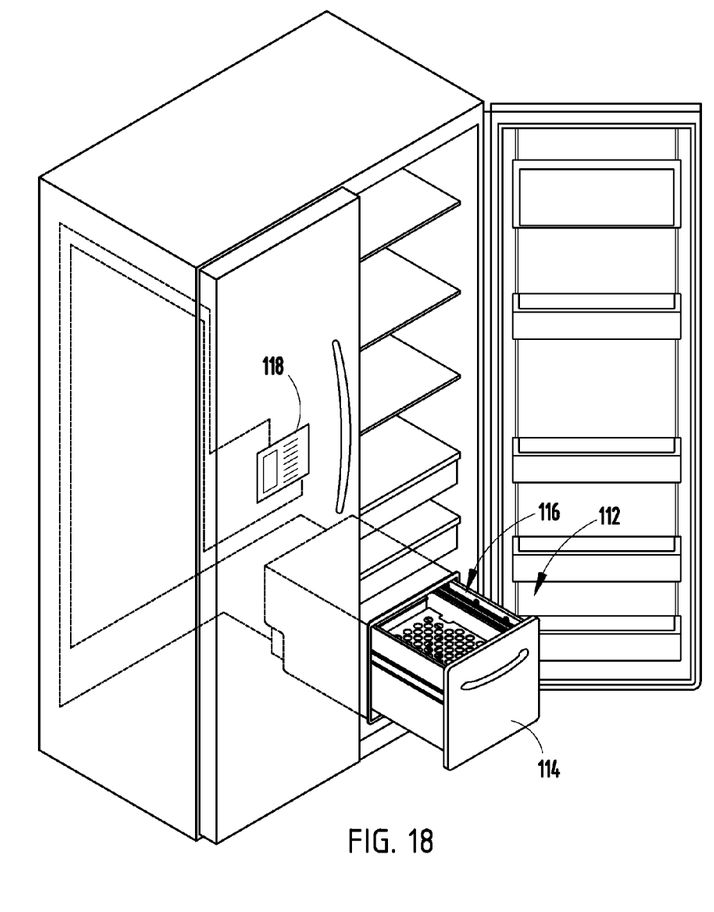
FIG. 18 is a top perspective view of another embodiment of a food storage compartment of the present invention.
Figures 19, 20:
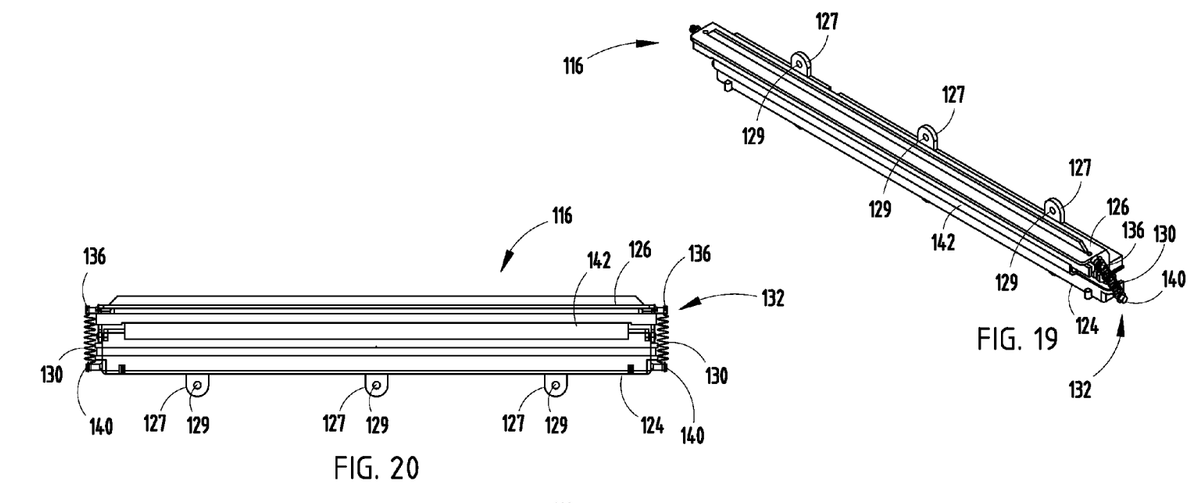
FIG. 19 is a top perspective view of another embodiment of a sealing unit of the present invention with the sealing bracket in the raised position.
FIG. 20 is a front elevational view of the sealing unit of FIG. 19.
Figure 21:
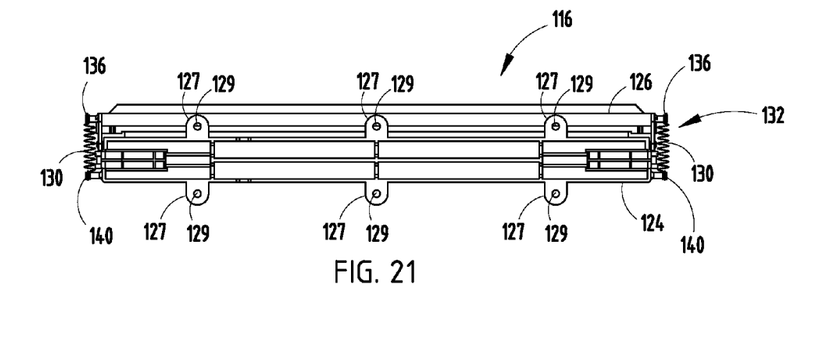
FIG. 21 is a rear elevational view of the sealing unit of FIG. 19.
Figure 22:
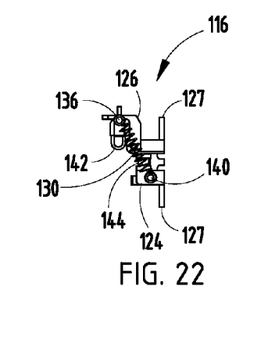
FIG. 22 is a side elevational view of the sealing unit of FIG. 19.
Figures 23, 24:
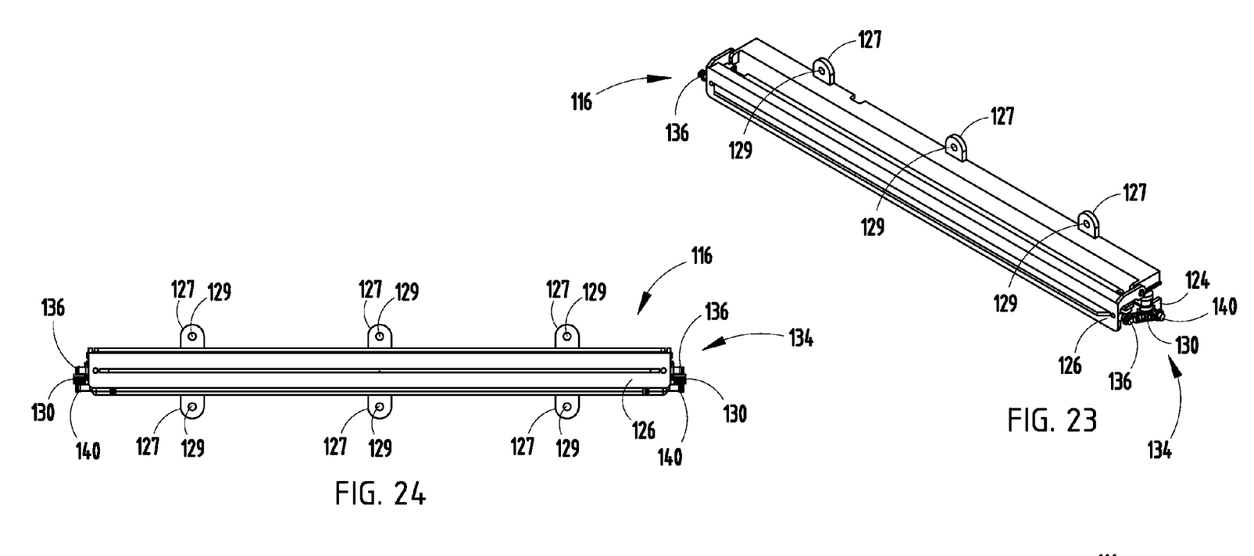
FIG. 23 is a top perspective view of one embodiment of a sealing unit of the present invention with the sealing bracket in the lowered position.
FIG. 24 is a front elevational view of the sealing unit of FIG. 23.
Figure 25:
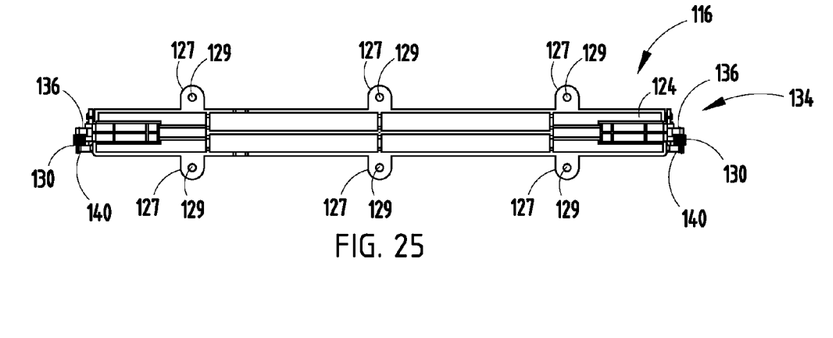
FIG. 25 is a rear elevational view of the sealing unit of FIG. 23.

FIG. 18 illustrates another embodiment of a food storage compartment 112 of the present invention. Structurally, the drawer unit 114 is very similar to the embodiment previously discussed, however, the drawer unit 114 includes a different sealing unit 116 and a control system 118 operable to evacuate air from the entire drawer unit 114 rather than a specific sealed compartment 120 formed by the sealing unit 116.

Referring to FIGS. 19-26, the sealing unit 116 includes a base 124 hingedly-connected to a sealing bracket 126. The base 124 includes mounts 127 with fastener apertures 129 for securing the sealing unit 116 onto the drawer unit 114. The sealing unit 116 is spring-biased. Similar to the previously discussed embodiment, elastic members 130 bias the sealing bracket 126 to a raised position 132 until the sealing bracket 126 is rotated past a predetermined rotation point wherein the elastic members 130 bias the sealing bracket 126 to a lowered position 134. The sealing bracket 126 includes sealing bracket extensions 136 that connect with elastic members 130, which in turn connect with base extensions 140 that extend from the base 124. Unlike the previously discussed embodiment, the sealing bracket 126 and the base 124 do not formed a sealed compartment when the sealing bracket 126 is in the lowered position 134. However, when the sealing bracket 126 is in the lowered position 134, the stop 142 aligns with the heat sealing bar 144 such that the open mouth 106 of a sealable bag 102 may be positioned between the stop 142 and the sealing bar 144 to seal the bag 102.

Figure 26:
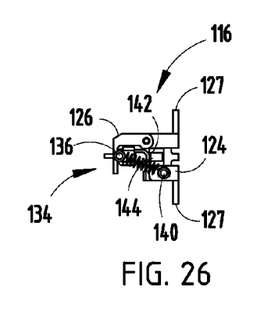
FIG. 26 is a side elevational view of the sealing unit of FIG. 23.
Figure 27A:
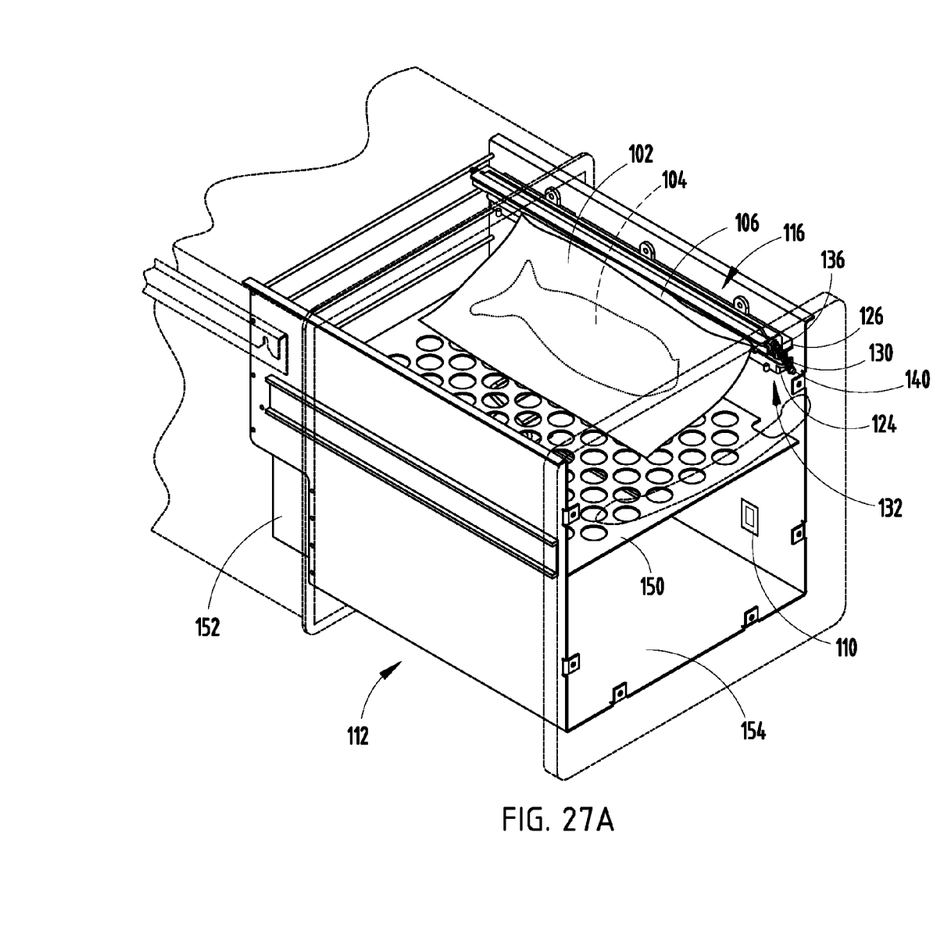
FIG. 27A is a top perspective view of a second embodiment of the drawer unit of the present invention.
Figure 27B:
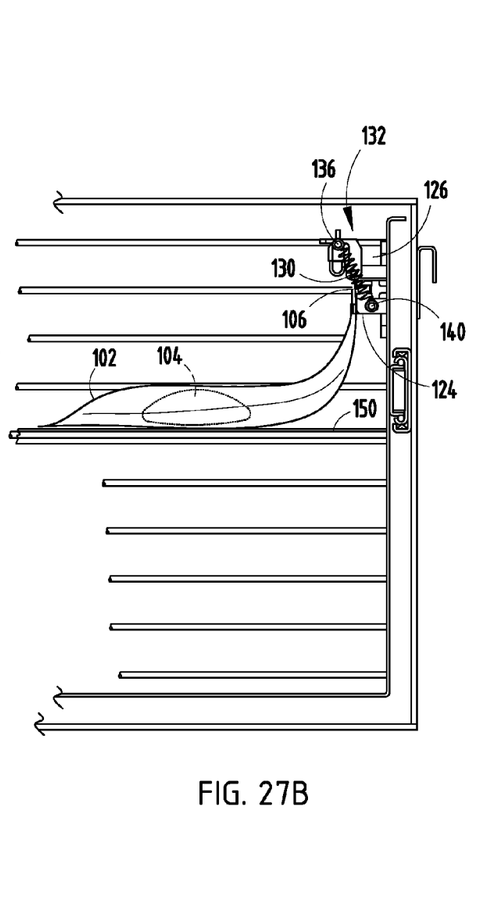
FIG. 27B is a partial front elevational view of the drawer unit of FIG. 27.
Figure 28A:
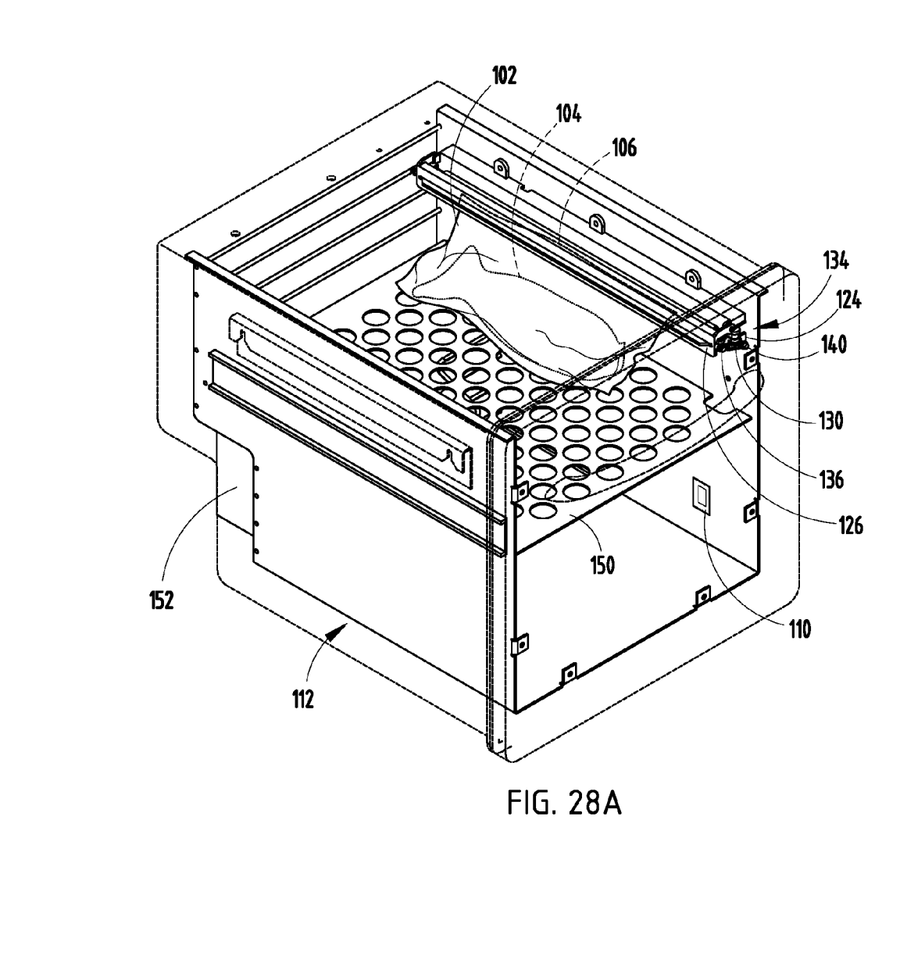
FIG. 28A is a top perspective view of the drawer unit of FIG. 27 after the interior of the drawer unit and the sealable bag have been vacuumed and during the sealing process.
Figure 28B:
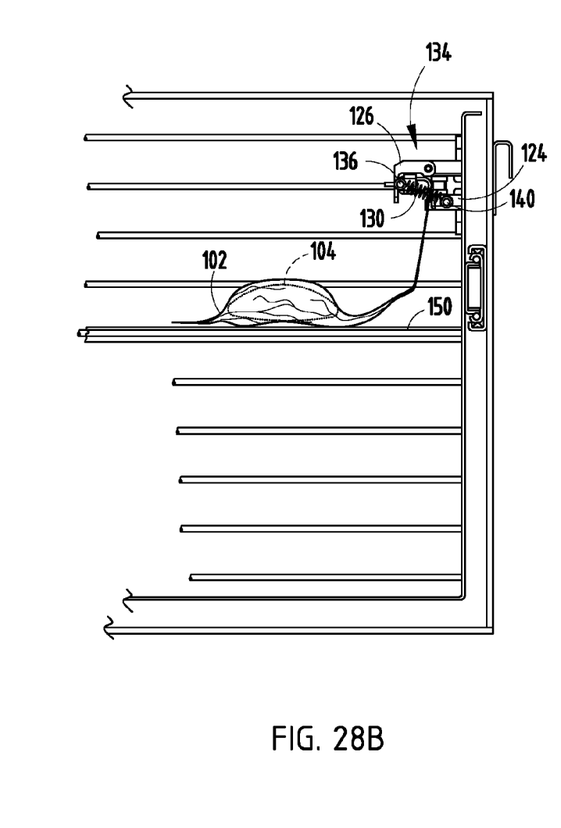
FIG. 28B is a partial front elevational view of the drawer unit of FIG. 28 during the sealing process.

Referring now to FIGS. 27A and 27B, to vacuum seal a sealable bag 102, the sealable bag 102 and its contents 104 are positioned in the drawer unit 114 on the platform 150. The open mouth 106 of the bag 102 is positioned adjacent the heat sealing bar 144 (FIG. 26). The sealing bracket 126 is closed down over the open mouth 106 of the sealable bag 102 such that the open mouth 106 of the sealable bag 102 is juxtaposed between the stop 142 and the heat sealing bar 144. The drawer unit 114 is then placed in the air-tight retracted position and the vacuum source 152 is then activated to evacuate air from the entire storage space 154 of the drawer unit 114 and consequently the sealable bag 102. When the drawer unit 114 has reached a predetermined optimum pressure level, the heat sealing bar 144 is activated to seal the sealable bag 102 in the vacuumed condition.

For the previously described embodiments, it is contemplated that the control system may be automatic, such that the vacuum source will activate when the sealing bracket is in the lowered position and the drawer unit is in the closed position. It is also contemplated that the control system may simply enable the sealing unit to operate when the sealing bracket is in the lowered position and when the drawer unit is in the closed position. Other possible variations exist depending on the needs of the user.

Figure 29:
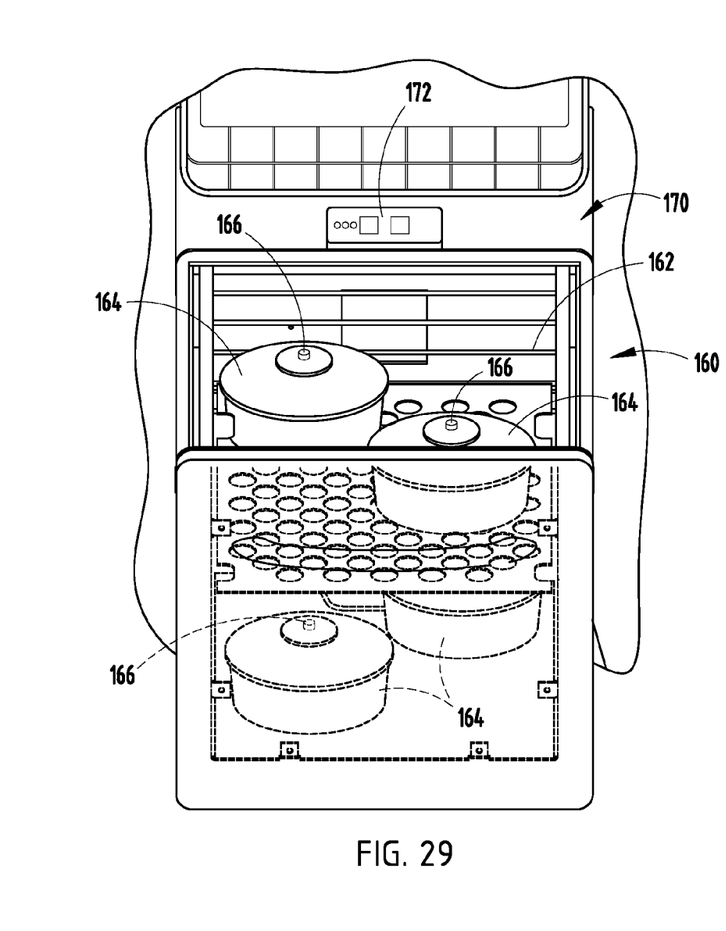
FIG. 29 is a front elevational view of one embodiment of the drawer unit in the open position prior to vacuuming hard containers.
Figure 30:
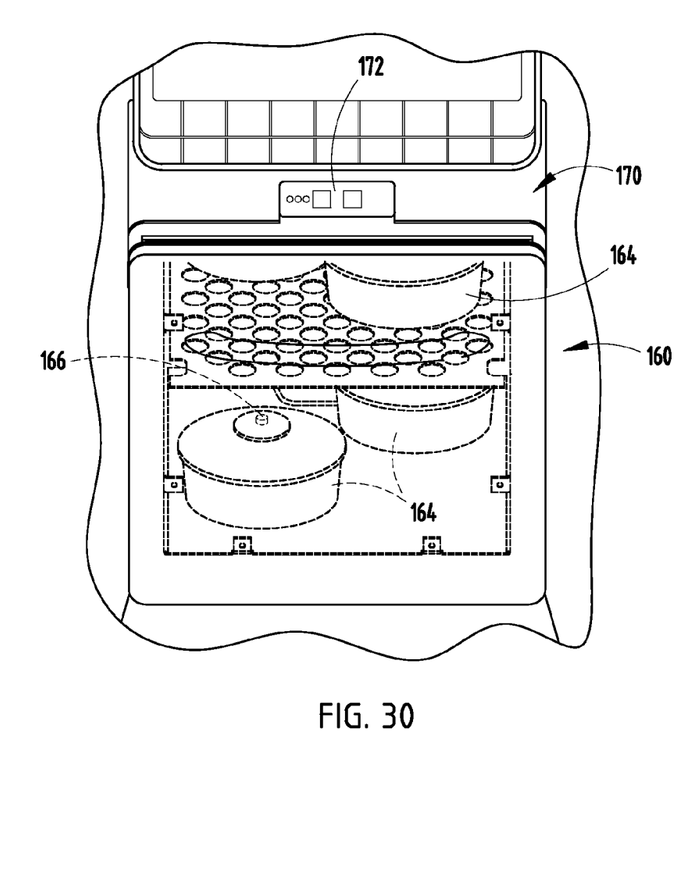
FIG. 30 is a front elevational view of the drawer unit of FIG. 29 vacuuming the hard containers.

Referring now to FIGS. 29 and 30, yet another embodiment of the present invention includes a drawer unit 160 operable to evacuate air from the storage space 162 and consequently evacuate air from hard containers 164 that include one-way valves 166 that allow the evacuation of air from the containers 164 but do not allow air back in. The hard containers 164 are simply positioned inside the storage space 162 of the drawer unit 160 and the drawer unit 160 is placed in the air-tight retracted position 170. The control system 172 is then activated such that air is withdrawn from the drawer unit 160 and the hard containers 164 are depressurized. It is contemplated that the hard containers 164 could also be positioned inside the drawer unit 160 of the previous embodiment, which incorporates sealing units.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:
1. A refrigerator comprising:
a food storage compartment including a drawer unit with a storage space and an adjustable perforated platform, the drawer unit being operable between a substantially air-tight retracted position and an open extended position, wherein the operable movement of the adjustable perforated platform is independent of the operable movement of the drawer unit between the substantially air-tight retracted position and the open extended position;
a vacuum source in communication with the storage space of the drawer unit and operable to reduce air pressure inside the drawer unit during an evacuation event when the drawer unit is in the air-tight retracted position;
a heat sealing unit disposed within the drawer unit adapted to seal a flexible bag;
a hard removable container disposed inside the storage space and including a valve that opens to allow depressurization of the hard removable container during the evacuation event; and
a control system operable to activate the vacuum source and initiate the evacuation event when the drawer unit has been placed in the air-tight retracted position, and operable to activate the heat sealing unit at least when the drawer unit has been placed in the air-tight retracted position.
2. The refrigerator of claim 1, wherein the valve is a one-way valve that allows depressurization of the hard removable container during the evacuation event and maintains a depressurized condition in the hard removable container when the drawer unit is in the open extended position.

3. The refrigerator of claim 1, wherein the food storage compartment includes a front wall having a portion that allows at least partial visibility into the drawer unit when the drawer unit is in the air-tight retracted position.

4. The refrigerator of claim 1, wherein the perforated platform is vertically adjustable within the drawer unit.

5. The refrigerator of claim 4, wherein the vertically adjustable platform includes at least one aperture therein.

6. The refrigerator of claim 1, wherein the drawer unit has first and second side walls and wherein at least one rear support extends between the first and second side walls.

7. A compartment for a refrigerator comprising:
a drawer unit having a storage space and operable between a closed retracted position and an open extended position;
a vacuum source in communication with the drawer unit;
a control system operable to activate the vacuum source and initiate an evacuation event;
a vertically adjustable platform disposed in the drawer unit, wherein the movement of the vertically adjustable platform is independent of the operable movement of the drawer unit between the closed retracted position and the open extended position; and
a hard removable container disposed inside the storage space and including a valve that opens to allow depressurization of the hard removable container during the evacuation event.

8. The compartment of claim 7, wherein the food storage compartment includes a front wall having a portion that allows at least partial visibility into the drawer unit when the drawer unit is in the closed retracted position.

9. The compartment of claim 7, wherein the vertically adjustable platform includes at least one aperture defined within a bottom wall of vertically adjustable perforated platform.

10. The compartment of claim 7, wherein the drawer unit has first and second side walls and wherein at least one rear support extends between the first and second side walls.

11. The compartment of claim 7, further comprising:
a sealing unit adapted to seal a flexible bag.

12. The compartment of claim 11, wherein the evacuation event occurs only in the sealing unit.

13. A method of sealing a storage container in a refrigerator, the method comprising:
providing a drawer unit in the refrigerator having a storage space and operable between a closed retracted position and an open extended position, wherein the drawer unit includes a vertically adjustable perforated platform, and wherein the movement of the vertically adjustable perforated platform is independent from the operable movement of the drawer unit between the closed retracted position and the open extended position;
inserting a hard container into the drawer unit;
providing a valve on the hard container;
actuating a vacuum source in communication with the storage space of the drawer unit to reduce air pressure within the hard container; and
removing the hard container from the drawer unit.

14. The method of claim 13, wherein the step of actuating a vacuum source in communication with the storage space further comprises:
reducing the air pressure in the hard container and the entire storage space.

15. The method of claim 13, wherein the vertical adjustable perforated platform includes at least one aperture defined within a bottom wall of the vertically adjustable perforated platform, such that a plurality of hard containers can be depressurized simultaneously.

* * * * *